US007359945B2

(12) United States Patent
Kaler et al.

(10) Patent No.: US 7,359,945 B2
(45) Date of Patent: Apr. 15, 2008

(54) USING CONDITIONAL STATEMENTS IN ELECTRONIC MESSAGES TO PREVENT OVERUSE OF RESOURCES OR TIME WHEN DELIVERING THE ELECTRONIC MESSAGE

(75) Inventors: Christopher G. Kaler, Sammamish, WA (US); Steven E. Lucco, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 849 days.

(21) Appl. No.: 10/310,303

(22) Filed: Dec. 5, 2002

(65) Prior Publication Data

US 2004/0111474 A1    Jun. 10, 2004

(51) Int. Cl.
*G06F 15/16* (2006.01)
*G06F 15/173* (2006.01)

(52) U.S. Cl. .................................. 709/206; 709/241
(58) Field of Classification Search ................ 709/238, 709/206, 239–242
See application file for complete search history.

(56) References Cited

U.S. PATENT DOCUMENTS

| | | | | |
|---|---|---|---|---|
| 5,166,927 A | * | 11/1992 | Iida et al. | 370/238 |
| 5,964,841 A | * | 10/1999 | Rekhter | 709/242 |
| 6,012,052 A | | 1/2000 | Altschuler et al. | 707/2 |
| 6,085,226 A | | 7/2000 | Horvitz | 709/203 |
| 6,088,718 A | | 7/2000 | Altschuler et al. | 709/203 |
| 6,154,767 A | | 11/2000 | Altschuler et al. | 709/203 |
| 6,182,133 B1 | | 1/2001 | Horvitz | 709/223 |
| 6,192,404 B1 | * | 2/2001 | Hurst et al. | 709/224 |
| 6,195,622 B1 | | 2/2001 | Altschuler et al. | 703/2 |
| 6,400,681 B1 | * | 6/2002 | Bertin et al. | 370/218 |
| 6,553,020 B1 | * | 4/2003 | Hughes et al. | 370/347 |
| 6,594,268 B1 | * | 7/2003 | Aukia et al. | 370/400 |
| 6,816,928 B1 | * | 11/2004 | Yoshii | 710/45 |
| 7,099,297 B2 | * | 8/2006 | Hughes et al. | 370/338 |
| 2003/0074413 A1 | * | 4/2003 | Nielsen et al. | 709/206 |

OTHER PUBLICATIONS

Nielsen et al., Web services routing protocol (WS-Routing), Oct. 23, 2001, pp. 1-25.*

* cited by examiner

*Primary Examiner*—Jason D Cardone
*Assistant Examiner*—Minh-Chau Nguyen
(74) *Attorney, Agent, or Firm*—Workman Nydegger

(57) ABSTRACT

A originating computing system sends an electronic message to a destination computing system via a routing path that includes one or more intermediary message processing computing systems. The originating computing system includes information in the electronic message that designates constraints related to resources or time use to delivery the message. For example, the constraints may include the number of hops, the amount of raw time, or the amount of processor time needed to delivery the message. If along the routing path, any of the intermediary computing systems detects that any of the constraints have been exceeded, then delivery of the electronic message may be abandoned. Any of the intermediary message processing computing systems may also specify constraints related to the resources or time used to delivery the electronic message.

34 Claims, 5 Drawing Sheets

USING CONDITIONAL STATEMENTS IN ELECTRONIC MESSAGES TO PREVENT OVERUSE OF RESOURCES OR TIME WHEN DELIVERING THE ELECTRONIC MESSAGE

BACKGROUND OF THE INVENTION

1. The Field of the Invention

The present invention relates to communications technology, and more specifically, to mechanisms for using conditional statements in an electronic message to prevent overuse of resources or time involved with delivering the electronic message.

2. Background and Relevant Art

Computing technology has transformed the way we work and play. Modern computer networking technologies and infrastructures allow for different applications and users to communicate data electronically even over vast distances relatively quickly using readily-available computing systems. Such computing systems may include, for example, desktop computers, laptop computers, Personal Digital Assistants (PDAs), digital telephones, or the like.

Currently, computing systems are so interconnected that one computing system is literally capable of communicating with any one of many millions of other computing systems spread throughout the globe. This is useful as we are now able to communicate more readily.

In its most general form, communication between computing systems involves the formation of an electronic message. That electronic message is then sent from the originating computing system to a destination computing system that is capable of interpreting at least some of the electronic message.

There may often be a number of complexities involved with delivering such an electronic message. For example, there may be a number of intermediary message processing computing systems that the electronic message is to be routed through on its way to the destination computing system. A "message processing computing system" or "message processor" is a computing system that is capable of reading or processing the message in some way.

Also, any one or more of the intermediary message processors in the routing path may have the message temporarily sent to yet other computing systems on the side in order to perform services before the intermediary message processor sends the message on to the next message processor. Accordingly, a number of different message processing computing systems may be involved with the delivery of the electronic message.

There are cases in which the amount of resources actually involved with delivering the electronic message is more than was anticipated by the sender. For example, when sending a message, the originating computing system may know of one intermediary message processor (such as a proxy), but may not be aware of how the routing will occur after the electronic message passes through the one known intermediary message processor. In some cases, the electronic message may encounter a high number of different "hops" before being delivered. A "hop" generally refers to the movement of an electronic message from one message processor to another message processor. In some cases, the message may even be stuck in a reoccurring loop due to routing errors. In that case, significant network bandwidth is used without purpose since the electronic message will simply cycle through the reoccurring loop without being delivered.

Some conventional technology attempts to eliminate the reoccurring loop scenario by dropping any message that passes through the same message processor twice. The assumption is that if the electronic message passes through the same message processor twice, then the electronic message must be going through a reoccurring loop. However, there are useful scenarios in which an electronic message may pass through the same message processor twice without necessarily being in a reoccurring loop.

For example, suppose that an intermediary message processor receives an electronic message that lacks something needed for the intermediary to process the electronic message, or lacks something needed to trust a previous message processing computing system node in the routing path. That intermediary message processor may rely on yet another message processor on the side to acquire the lacking information. After processing on the side, the electronic message including the supplemented information may then be returned back to the intermediary for further routing towards the destination computing system.

In this case, the electronic message passes through an intermediary message processor twice, once when the electronic message was originally received by the intermediary, and once when the electronic message was returned with the supplemental information to the intermediary. Conventional technology might therefore drop the electronic message despite the lack of a recurring loop.

In addition to passing through an unacceptably high number of different computing systems on its way from the originating computing system to the destination computing system, there may be an unexpectedly high amount of raw time, or processing resources needed to deliver the message. In some case, the amount of resources taken to deliver the message may be higher than it is worth to deliver the message. Accordingly, what would be advantageous are mechanisms that allow for the reduction (or even elimination) of resources used when delivering a message in cases when delivery without intervention would result in the unacceptably high network resource usage.

BRIEF SUMMARY OF THE INVENTION

The foregoing problems with the prior state of the art are overcome by the principles of the present invention, which are directed towards mechanism for allowing an originating computing system (or any intermediary message processing computing system in the routing path to the destination computing system) to restrict the amount of resources that may be used to delivery the electronic message.

The originating computing system first generates an electronic message that is destined for a destination computing system. The originating system may optionally include information in the electronic message that designates constraints related to how much resource usage the delivery of the electronic message may take before delivery of the electronic message is abandoned. For example, if the electronic message were a Simple Object Access Protocol (SOAP) message, this information may be included within the header portion of the SOAP envelope.

Any of the intermediary message processing computing systems on the routing path from the originating computing system may check the constraints imposed by the originating computing system (or by any previous intermediary message processor that is present in the routing path) to determine if any constraints have been violated. If a violation has been detected, then delivery of the electronic message may be abandoned. Also, even if delivery is continues, the intermediary message processor may actually add its own constraints that would result in abandoning delivery of the electronic message. The constraints may be signed such that the intermediary message processor only drops the electronic message if the intermediary trusts the signer of the constraint that suggests that the electronic message be dropped.

The constraints may involve a maximum number of hops that the electronic message may take on its way through the routing path. Accordingly, if the electronic message gets stuck in a recurring loop, the electronic message will be dropped. This is advantageous since the electronic message would not be delivered anyway and would only be taking up network and processing resources. Also, the constraints may refer to the raw time or the processing time taken to deliver the electronic message. Accordingly, the, principles of the present invention enable far more control over when delivery of an electronic message is abandoned. More important electronic message may be given priority over resource usage, while less important electronic message receive less resource usage.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
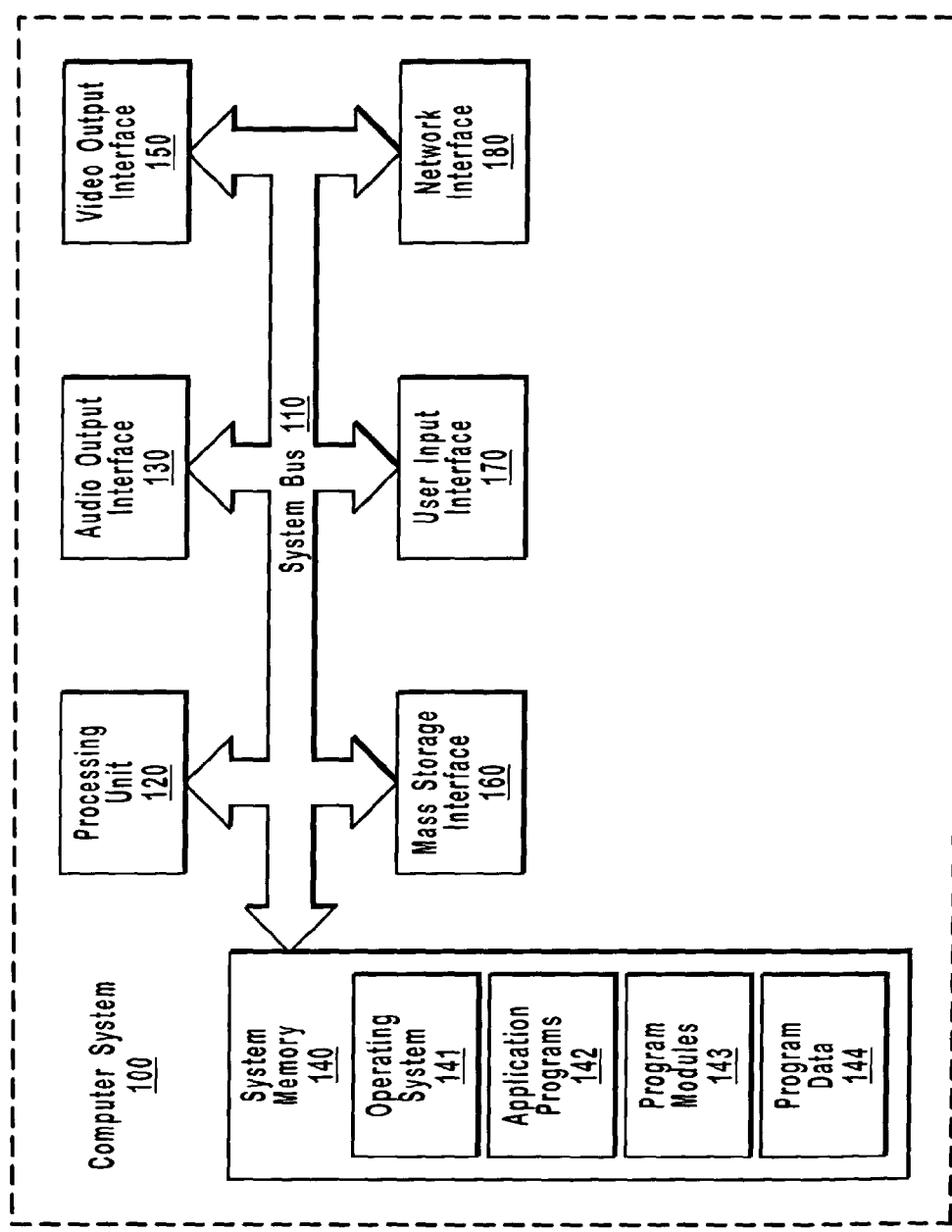
FIG. 1 illustrates a suitable operating environment for the principles of the present invention.

An originating computing system sends an electronic message to a destination computing system via a routing path that includes one or more intermediary message processing computing systems. The originating computing system includes information in the electronic message that designates constraints related to resources or time used to deliver the message. If along the routing path, any of the intermediary computing systems detects that any of the constraints have been exceeded, then delivery of the electronic message may be abandoned. Any of the intermediary message processors may also specify constraints related to the resources or time used to deliver the electronic message. Accordingly, the sender, and even any of the intermediary message processors along the routing path may specify constraints that result in non-delivery of the message.

Embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code.

In this description and in the following claims, a "computer system" or "computing system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, multi-processor systems, minicomputers, mainframe computers, network PCs, routers, gateways, firewalls, proxies, hand-held devices, microprocessor-based or programmable consumer electronics, mobile telephones, PDAs, pagers, and the like. The invention may also be practiced in distributed system environments where local and remote computer systems, which are linked (either by hardwired links, wireless links, or by a combination of hardwired or wireless links) through a communication network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a computer system 100. Computer system 100 may be, for example, a personal computer that has been adapted to perform the operations disclosed herein.

Computer system 100 includes a user input interface 170 that receives information from an input device, such as, for example, a keyboard, microphone, or mouse. An input device can be coupled to user input interface 170 so as to enable the entry of information. An input device may transfer information over such a coupling in response to preprogrammed data or user manipulation of the input device.

Computer system 100 includes a video output interface 150 that provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which may include a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 may include mass storage interface 160, which can read data from and/or write data to a mass storage device, such as, for example, a magnetic disk or optical disk. A mass storage device can be coupled to mass storage interface 160 so as to enable the reading and writing of data. When a mass storage device is coupled to mass storage interface 160, one or more program modules including operating system 141, application programs 142, other program modules 143, and program data 144 may be stored in the mass storage device.

Computer system 100 is connectable to networks, such as, for example, an office-wide or enterprise-wide computer network, an intranet and/or the Internet. Computer system 100 includes network interface 180, through which computer system 100 receives data from external sources and/or transmits data to external sources. Computer system 100 may exchange data with external sources, such as, for example, remote processor systems and/or databases over such a network.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

Figure 2:
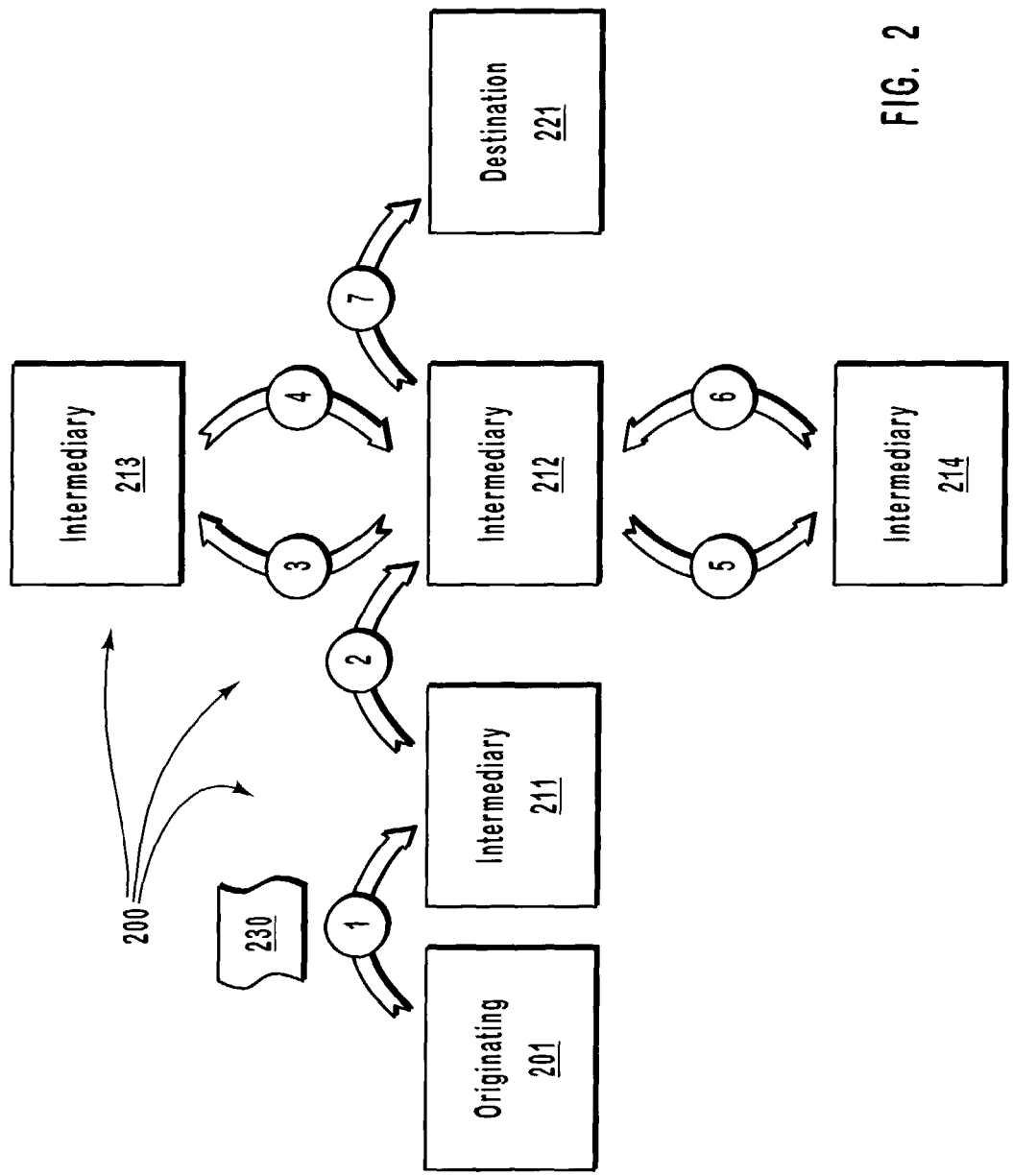
FIG. 2 illustrates an example network configuration in which the principles of the present invention may be employed.

FIG. 2 illustrates a computer network 200 that includes a number of message processing computing systems, which may be structured as described above with respect to computer system 100. The computer network 200 includes an originating computing system 201 which generates and dispatches an electronic message 230 to a destination computing system 221. The originating computing system 201 and the destination computing system 221 may be any computing system such as, for example, a desktop computer, a laptop computer, a Personal Digital Assistant (PDA), a telephone or the like. Accordingly, the computer network 200 may be portions of number of different types of networks as suitable for the originating and destination computing systems such as, for example, a digital telephone network, the Internet, a Local Area Network (LAN) or the like). The electronic message 230 may be any electronic message capable of transmission over a network and capable of facilitating the principles of the present invention claimed herein.

Of course, the electronic message may pass through a number of intermediary message processing computing systems on its way to the destination computing system. Such intermediary message processors may include, for example, a proxy, or any other computing system that is capable of accessing and processing the message. The path that an electronic message takes when being delivered is often referred to as a routing path. Conceptually, a network may have a wide variety of different routing paths.

For example, in FIG. 2, the electronic message 230 first passes from the originating computing system 201 to the intermediary message processor 211 as represented by arrow 1. For example, the originating computing system may be a client computing system with the intermediary message processor 211 being a proxy computing system. The electronic message 230 then passes from the intermediary message processor 211 to the intermediary message processor 212 as represented by arrow 2. The intermediary message processor 212 may be, for example, an entry point onto corporate network.

The intermediary message processor 212 then passes the electronic message 230 to a side intermediary message processor 213 (as represented by arrow 3) to perform supplemental processing of the electronic message 230. For example, the side intermediary message processor 213 may be, for example, a decryption service. The side intermediary message processor 213 then passes the electronic message 230 back to the intermediary message processor 212 (as represented by arrow 4), which then passes the electronic message 230 to a second side intermediary message processor 214 (as represented by arrow 5). The second side intermediary message processor 214 may be, for example, an authentication service. The second side intermediary message processor 214 then passes the electronic message 230 back to the intermediary message processor 212 (as represented by arrow 6) whereupon it is delivered to the destination computing system 221 (as represented by arrow 7).

Note that here the electronic message 230 passes through the intermediary message processor 212 three times before delivery. This was not representative of any recurring loop at all. The electronic message was just handed off to two side intermediary computing systems for temporary processing. Conventional techniques that drop electronic messages when they pass through the same message processing computing system would have resulted in the electronic message being dropped, despite the fact that the electronic message was not in a recurring loop, but was making progress towards delivery.

Figure 3:
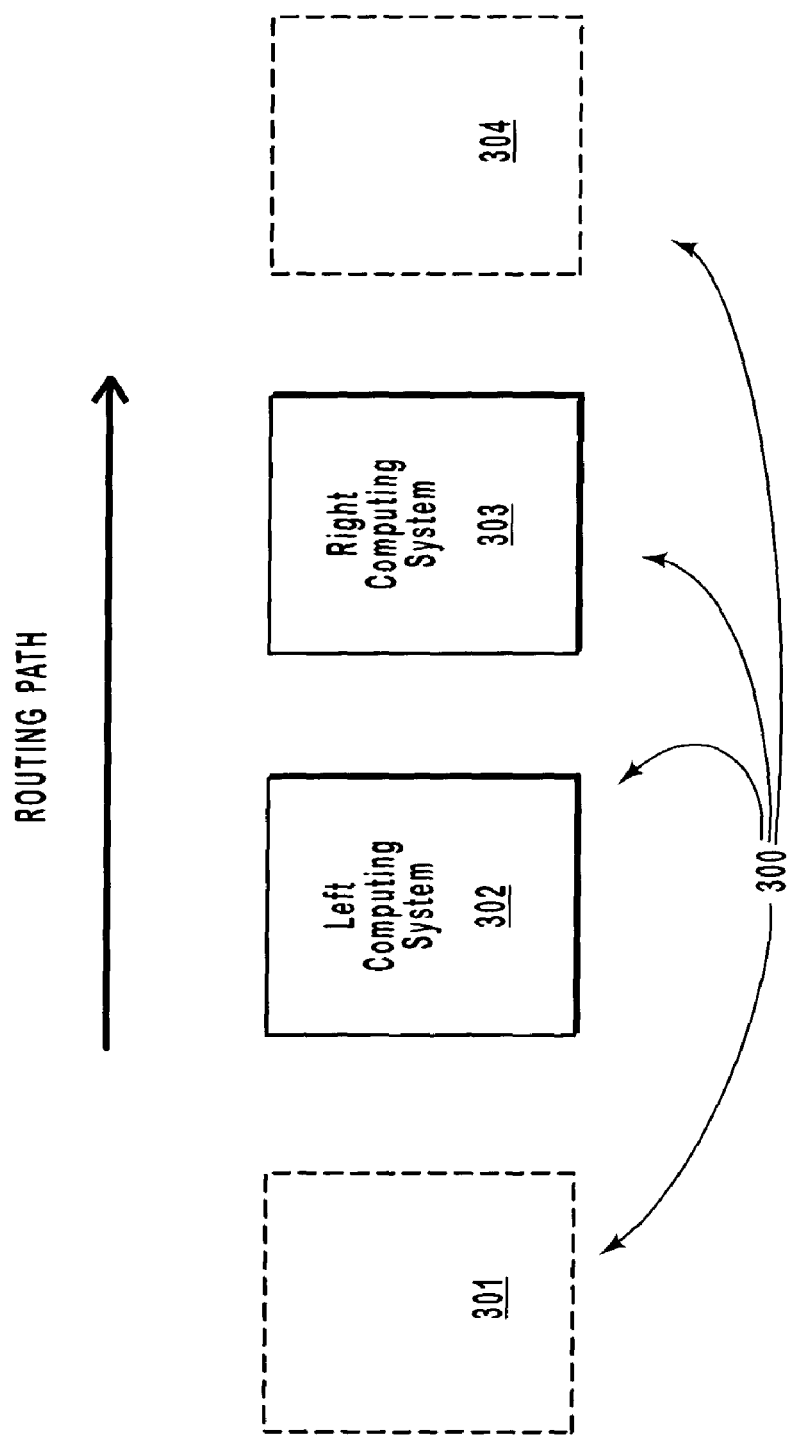
FIG. 3 illustrates a more general network configuration in which there are illustrated two message processing computing systems arrayed with other potential message processors in along a routing path of the electronic message.

The network configuration of FIG. 2 is only one of many examples of how an electronic message may be routed between various message processors. FIG. 3 represents a more generalized network configuration 300 that represents any routing path. The routing path is represented in a serialized fashion as moving from left to right. Note that a single computing system may occur more than once in such a serialized routing path. For example, in FIG. 2, the electronic message passes through the intermediary computing system 212 three times before delivery. In this case, each instance that the electronic message passing through the same intermediary computing system would be represented by a different box in the serialized routing path.

For clarity, only a left message processing computing system 302 and a right message processing computing system 303 are shown with a solid box. The left computing system 302 may be, for example, the originating computing system for the electronic message. However, the left computing system 302 may also be one of the intermediary message processors in the routing path, in which case there is a previous message processing computing system 301 in the routing path. The right computing system 303 may be, for example, any of the intermediary message processor in the routing path. If the right computing system 303 is not the final intermediary message processor in the routing path, then there would be a next intermediary message processor 304.

Figure 4:
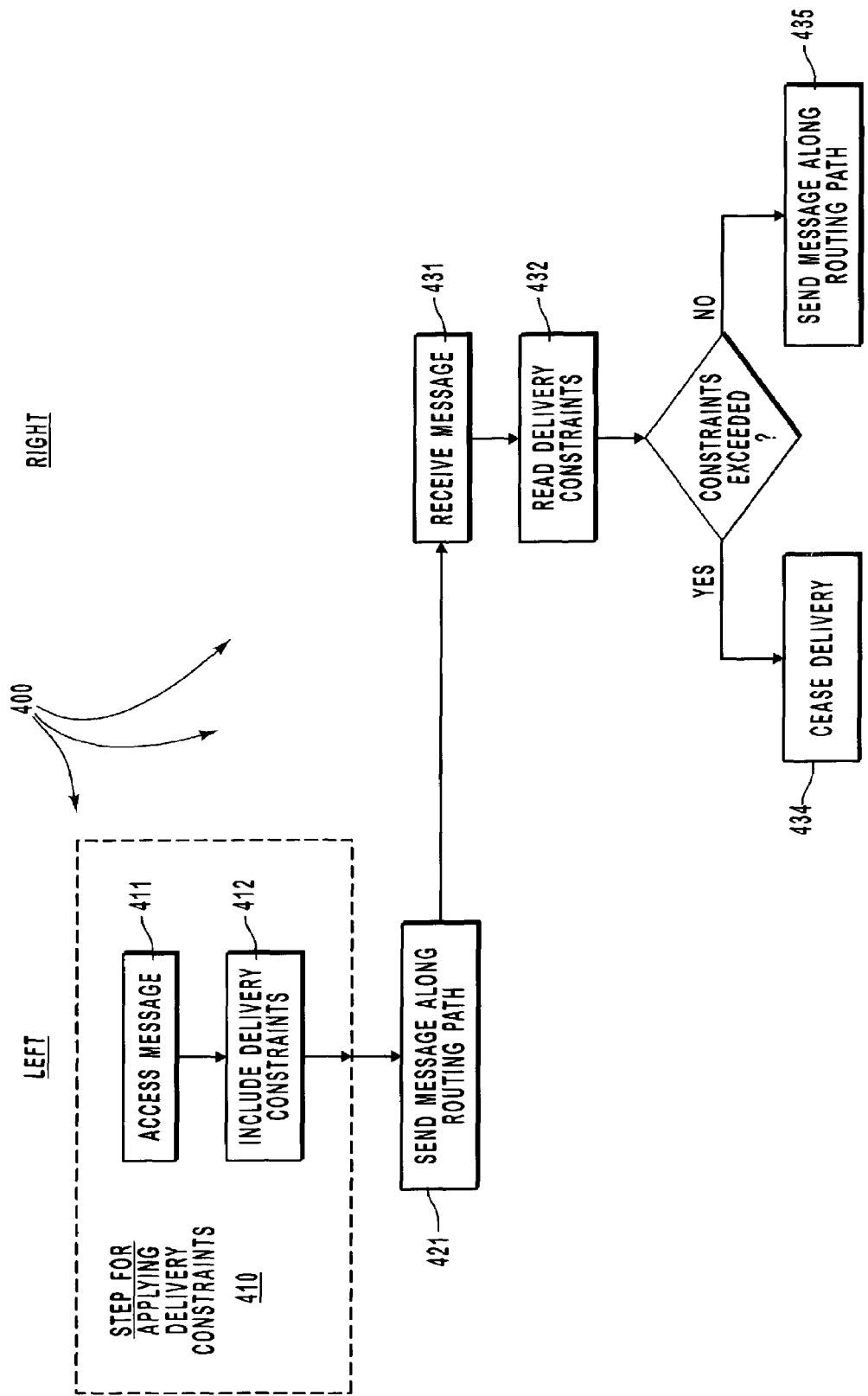
FIG. 4 illustrates a flowchart of a method for allowing the left computing system of FIG. 3 to constrain the downstream resources that delivery of the electronic message may consume, and a method for the right computing system to verify if the resources allowed by an upstream computing system have been exceeded to thereby potentially drop the electronic message.
Figure 5:
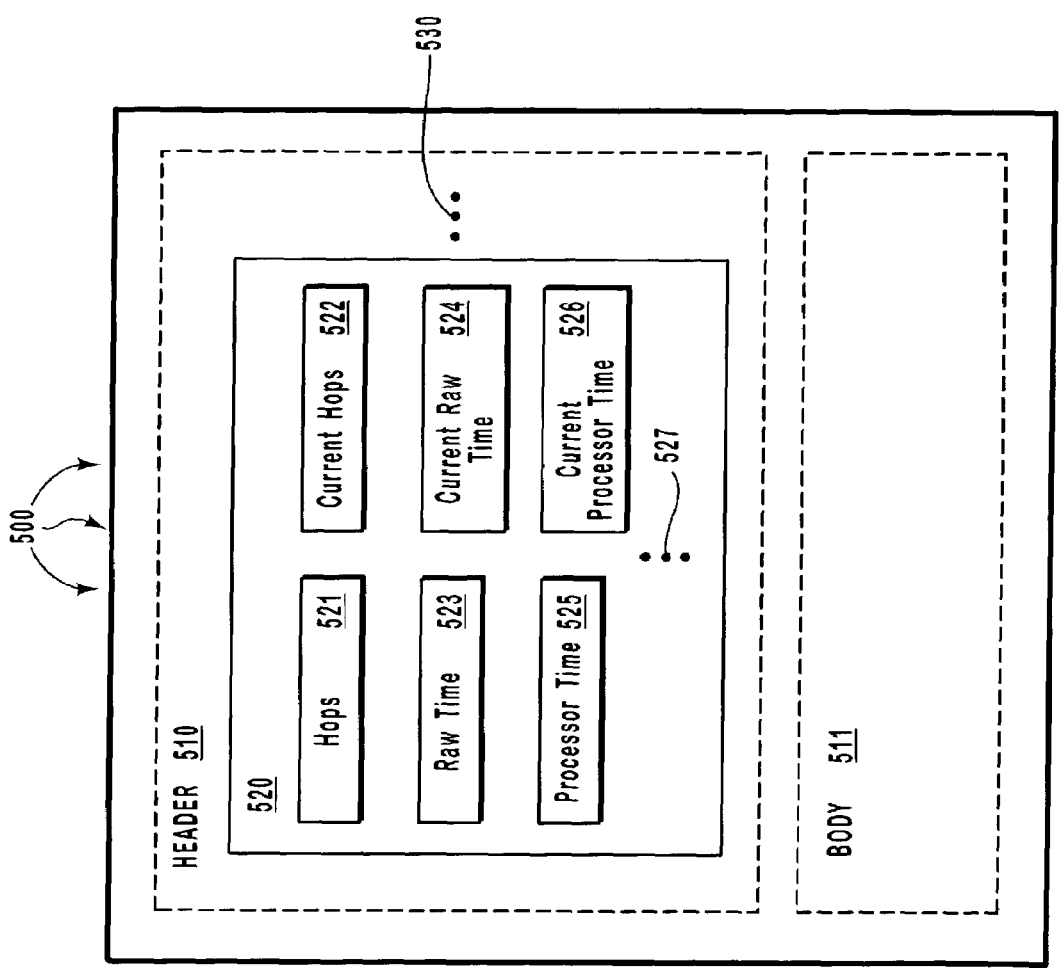
FIG. 5 illustrates a data structure of an electronic message in accordance with the principles of the present invention in which one or more constraints may be specified by one or more upstream computing systems to affect the resources consumed by delivery of the electronic message downstream.

FIG. 4 illustrates a flowchart of a method 400 for allowing an upstream computing systems in the routing path to have more control over resources expended in deliverying the electronic message downstream in the routing path. Much of the method 400 involves the structuring and interpreting of an electronic message that designates one or more constraints to be applied when delivering the electronic message. A schematic diagram of a data structure of such a message is illustrated in FIG. 5 as data structure 500. Accordingly, the flowchart of FIG. 4 will now be described with frequent reference to the data structure of FIG. 5.

Referring back to FIG. 4, some of the acts and a step of the method 400 are performed by the left computing system 302 as represented in the left column of FIG. 4 under the heading "LEFT. On the other hand, other acts are performed by the right computing system 303 as represented in the right column of FIG. 4 under the heading "RIGHT".

The left computing system 302 performs a functional, result-oriented step for applying delivery constraints on an electronic message (step 410). This functional, result-oriented step may be accomplished via any suitable corresponding acts. However, in FIG. 4, the step 410 includes corresponding acts 411 and 412.

More specific, the left computing system 302 accesses an electronic message that is destined for the destination computing system (act 411). If the left computer system 302 were the originating computing system, then the electronic message may be accessed by generating the electronic message. On the other hand, if the left computer system 302 was one of the intermediary message processors, then accessing might include receiving the electronic message from the previous intermediary message processing computing system or from the originating computing system as appropriate.

The step 410 then includes the corresponding an act of including information in the electronic message that designates one or more constraints related to resources or time used to deliver the electronic message to the destination computing system (act 412). If a subsequent intermediary message processing computing system in the routing path detects that the constraints have been exceeded, then that subsequent computing system may perhaps not deliver the electronic message to the destination computing system.

For example, the data structure 500 of FIG. 5 includes a header portion 510 and a body portion 511. The header portion 510 includes a number of constraint fields including constraint field 520 among others as represented by the horizontal ellipses 530. Each of the constraint field may have been populated by a previous message processing computing system in the routing path. For example, left computing system 302 may have populated the constraint field 520. The constraint field 520 may include any constraints related to the amount of resources that may be used to deliver the electronic message.)

For example, the constraint field may specify an expected range of hops or a maximum number of hops that the message may take on its way to the destination computing system. If that expected range is exceeded, or if the maximum number of hops is exceeded, then the electronic message may be dropped. For example, the constraint field 520 may include a hops field 521 that represents a constraint on the number of hops allowed for delivery of the electronic message. A current hops field 522 specifies the number of hops taken to deliver the message so far. If the number of current hops taken equals or perhaps exceeds an expected or a maximum number of hops, then the electronic message may be dropped. This allows for an upstream messaging processing computing system to constrain the delivery of the electronic message such that if something like a recurring routing loop were to occur, the message would be ultimately dropped without expending undue resources.

In one embodiment, the data structure is a Simple Object Access Protocol (SOAP) envelope with the header field 510 being the header field of the SOAP envelope, and with the body field 520 being the body of the SOAP envelope. The header in a SOAP header may be expressed as an eXtensible Markup Language (XML) element. The following represents an example of an XML element that may be suitable for representing constraints related to hops.

```
<Hops>
    <HopCount Sig = ". . ." Value = "3" />
    <Expected Sig = ". . ." Min = "3", Max = "6" />
    <Limit Sig = ". . ." Value = "10" />
</Hops>
```

In this example XML element, the electronic message has experienced three hops already in the delivery process as represented by the HopCount element. The previous message processing computing system that inserted the Hops element expected that the number of hops would range from three to six hops as represented by the Expected element. If there are ten hops, then the previous message processing computing system that inserted the Hops element would like the message to be dropped.

Note that this element also includes signature attributes called "Sig". This allows for a subsequent message processing computing system in the routing path to identify who inserted the constraint, and whether or not that computing system is trusted enough to honor the constraint.

The constraint field 520 may also potentially include other types of constraints such as the permitted amount of total raw or processor time permitted for delivery of the electronic message. For example, the constraint field 520 may include a raw time field 523 that specifies the total amount of raw time permitted for delivery, and a current raw time field 524 that represents the total raw time taken so far in delivering the electronic message. Also, a processor time field 525 specifies the total amount of processor time permitted for delivery, and a current processor time field 526 that specifies the total amount of processor time taken so far in delivering the electronic message. There may also be other types of constraints are represented by the vertical ellipses 527.

The left computing system 302 then sends the electronic message to the right computing system (act 421), whereupon the right computing system receives the electronic message (act 431). The right computing system 303 then reads the information in the electronic message that designates one or more constraints related to resources or time used to deliver the electronic message to the destination computing system (act 432). Then, the right computing system determines whether at least one of the one of more constraints has been exceeded. If yes, then the electronic message may be dropped (act 434) and the originating computing system potentially notified. If no, then the electronic message may be forwarded along to the next message processing computing system in the routing path (act 435), whether that be to the destination computing system, or the next intermediary message processing computing system.

Note that the right computing system 303 may also perform the acts described above as being performed by the left computing system 302. Namely, the right computing system 302 may also include delivery constraints in the electronic message prior to sending the electronic message further along the routing path.

Accordingly, the principles of the present invention allow for multiple message processing systems in the routing path from the originating computing system to the destination computing system to influence whether or not the delivery of the electronic message justifies the continued use of resources or time. Furthermore, downstream computing systems may interject their own constraints, and may adjust constraint for subsequent message when, after monitoring previous traffic, there is an indication that the constraints should be adjusted.

For example, suppose that the maximum number of hops for an electronic message is 30, but the computing system has noticed that electronic message having particular characteristics present in the electronic message are never delivered regardless of the number of hops, the computing system may adjust downward the number of permitted hops for similar subsequent electronic messages since it is likely that all 30 hops will be used and wasted.

Also, the use of signatures allows for subsequent computing systems to treat constraints differently depending on how much the signer is trusted. Furthermore, different electronic message having different characteristics may be treated differently. For example, an electronic message from a preferred customer may be granted a higher number of maximum hops or processing time than a less-preferred customer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computer network that includes a computing system capable of originating a Simple Object Access Protocol (SOAP) message and dispatching the SOAP message along a routing path towards a destination computing system, the routing path including one or more intermediary message processing computing systems, a method for allowing the originating computing system or any of the one or more message processing intermediary computing systems to configure an amount of resources used to deliver the SOAP message, the method comprising the following:

an act of an intermediary message processing computing system accessing the SOAP message that is destined for the destination computing system, the SOAP message having been transmitted by the originating computing system, the SOAP message including modifiable constraint information that designates one or more constraints related to resources or time used to deliver the contents of the SOAP message to the destination computing system along with corresponding values indicative of how close the one or more constraints currently are to being exceeded, the modifiable constraint information being accessible to any message processing computer system in the routing path of the SOAP message such that any message processing computer system in the routing path can modify the modifiable constraint information included in the SOAP message during transmission of the SOAP message, to influence delivery of the SOAP message during transmission of the SOAP message, wherein if a subsequent message processing computing system in the routing path detects, during transmission of the SOAP message, that a constraint has been exceeded, through comparison of the one or more constraints and corresponding indicative values included in the SOAP message, then the subsequent message processing computing system does not deliver the SOAP message to the destination computing system;

an act of the intermediary message processing computing system modifying the modifiable constraint information included in the accessed SOAP message during transmission of the SOAP message to influence delivery of the SOAP message; and an act of sending the SOAP message with the modified constraint information to the next message processing computing system in the routing path.

2. A method in accordance with claim 1, wherein the act of including modifiable information in the SOAP message that designates one or more constraints comprises the following:

an act of including information that designates a number of hops that the SOAP message is expected to take on the routing path.

3. A method in accordance with claim 2, wherein the act of including modifiable information in the SOAP message that designates one or more constraints comprises the following:

an act of including information that designates a maximum number of hops that the SOAP message is to take on the routing path.

4. A method in accordance with claim 3, wherein the act of receiving the SOAP message from a previous message processing computing system in the routing path comprises the following:

an act of receiving the SOAP message from a previous intermediary message processing computing system in the routing path.

5. A method in accordance with claim 3, wherein the act of receiving the SOAP message from a previous message processing computing system in the routing path comprises the following:

an act of receiving the SOAP message from the originating computing system.

6. A method in accordance with claim 1, wherein the method is performed by one of the one or more intermediary message processing computing systems, wherein the act of accessing a SOAP message that is destined for the destination computing system comprises the following:

an act of receiving the SOAP message from a previous message processing computing system in the routing path.

7. A method in accordance with claim 6, wherein the act of receiving the SOAP message from a previous message processing computing system in the routing path comprises the following:

an act of receiving the SOAP message from a previous intermediary message processing computing system in the routing path.

8. A method in accordance with claim 6, wherein the act of receiving the SOAP message from a previous message processing computing system in the routing path comprises the following:

an act of receiving the SOAP message from the originating computing system.

9. A method in accordance with claim 1, wherein the method is implemented by a computer program product.

10. A method in accordance with claim 1, wherein the method is implemented by computer hardware.

11. A method in accordance with claim 1, wherein the act of including modifiable information in the SOAP message comprises the following:

an act of monitoring past delivery history for the SOAP message having at least one similar characteristic to the SOAP message; and an act of adjusting the one or more constraints for a previous setting for the one or more constraints based on the past delivery history.

12. A method in accordance with claim 1, wherein the act of sending the SOAP message to the next message processing computing system in the routing path comprises the following:

an act of sending the SOAP message to the next of the one or more intermediary message processing computing systems in the routing path.

13. A method in accordance with claim 1, wherein the method is performed by the originating computing system, wherein the act of accessing a SOAP message that is destined for the destination computing system comprises the following:

an act of generating the SOAP message.

14. A method in accordance with claim 1, wherein the SOAP message has a header portion and a body portion, wherein the act of including modifiable information in the SOAP message that designates one or more constraints comprises the following:

an act of including information in the header portion of the SOAP message that designates the one or more constraints.

15. A method in accordance with claim 1, wherein the act of including modifiable information in the SOAP message that designates one or more constraints comprises the following:

an act of including information that designates a maximum number of hops that the SOAP message is to take on the routing path.

16. A method in accordance with claim 1, wherein the act of including information modifiable in the SOAP message that designates one or more constraints comprises the following:

an act of including information that designates a maximum amount of time that the SOAP message is to take on the routing path.

17. A method in accordance with claim 1, wherein the act of including modifiable information in the SOAP message that designates one or more constraints comprises the following:

an act of including information that designates a maximum amount of processor time that the SOAP message is to take on the routing path.

18. A method in accordance with claim 1, wherein the act of including modifiable information in the SOAP message that designates one or more constraints comprises the following:

an act of signing the information; and an act of including the signed information in the SOAP message.

19. A method in accordance with claim 1, wherein the modifiable information is first information and wherein the one or more constraints are first one or more constraints, wherein the act of accessing a SOAP message that is destined for the destination computing system comprises the following:

an act of receiving the SOAP message;

an act of reading second information in the SOAP message that designates second one or more constraints related to resources or time used to deliver the SOAP message to the destination computing system; and an act of determining whether at least one of the second one of more constraints have been exceeded.

20. A method in accordance with claim 1, farther comprising:

an act of an intermediary message processing computing system receiving the SOAP message that includes modifiable constraint information;

an act of determining that a prior intermediary message processing computing system modified the modifiable constraint information, the determination comprising identifying which prior intermediary computing system performed the modification and which constraints were modified;

an act of determining that the prior intermediary computing system satisfies a threshold level of trust with the intermediary computing systems; and an act of retaining the modified constraint information in the SOAP message for sending to the next message processing computing system in the routing path based on the prior intermediary computing system satisfying the threshold level of trust.

21. A method in accordance with claim 1, wherein the resource usage priority is modified differently based on the characteristics of the SOAP message.

22. A method in accordance with claim 1, wherein a constraint in an SOAP message is adjusted when monitored SOAP message traffic indicates that the constraint should be adjusted.

23. A method in accordance with claim 1, wherein the message processing intermediary computing system modifies the modifiable constraint information of an SOAP message.

24. A method according to claim 1, wherein the act of including modifiable constraint information for the SOAP message in the SOAP message that designates one or more constraints related to resources or time used to deliver the contents of the SOAP message to the destination computing system comprises including modifiable constraint information for the SOAP message in the SOAP message based on the importance of the message, the modifiable constraint information designating one or more constraints related to a given resource usage priority when delivering the contents of the electronic message to the destination computing system along with corresponding values indicative of how close the one or more constraints currently are to being exceeded.

25. A method for terminating transmission of a SOAP message before it reaches a destination computer, the method comprising:

receiving the SOAP message at an intermediary computer that is on a path of intermediary computers over which the SOAP message has traveled via network communication, the SOAP message comprising a SOAP envelope that includes message information, where either:

the message information comprises a value that increased or decreased as the SOAP message traveled along a path of intermediary computers, or the message information comprises information that can be used by an intermediary computer to calculate a value that will have increased or decreased as the SOAP message traveled along the path of intermediary computers;

making a determination at an intermediary computer during transmission of the SOAP message whether to forward the SOAP message over the network based on the value in or calculated from the message information;

forwarding the SOAP message when the determination is to forward the SOAP message; and terminating transmission of the SOAP message when the determination is to not forward the SOAP message.

26. A method according to claim 25, wherein the message information corresponds to an amount of processing resource used by the intermediary computers on the path, the processing resource having been used by the intermediary computers to process the SOAP message.

27. A method according to claim 26, wherein the processing resource comprises CPU time.

28. A method according to claim 25, wherein the making the determination comprises comparing a threshold value with the value in or calculated from the message information.

29. A method according to claim 25, wherein the message information comprises information indicating a time when the SOAP message was transmitted.

30. A method according to claim 25, wherein the message information indicates the number of times the message has traveled through the intermediary computers on the path.

31. A method according to claim 25, wherein the message information comprises a decreasing number of times that the SOAP message may be forwarded by any intermediary computer.

32. A method of handling Simple Object Access Protocol (SOAP) messages, each SOAP message comprising XML markup code delimiting at least a header of such message, the method comprising:

receiving the SOAP messages at an intermediary computer, the SOAP messages being received via a network, the SOAP messages having been originally transmitted over the network by originating computers and some of the SOAP messages having also been forwarded over the network by other intermediary computers, where the header of each of the SOAP messages comprises an XML element comprising a handling-limit value and a handled value, the handled value indicating an extent to which the SOAP message has been handled by other intermediary computers that forwarded the SOAP message;

updating, by the intermediary computer, during transmission of the SOAP message, the handled values of the SOAP messages to reflect their handling by the intermediary computer;

for each SOAP message, determining, by the intermediary computer, during transmission of the SOAP message, whether to forward the SOAP message based on the handled value of the SOAP message and based on the handling-limit value of the SOAP message;

in accordance with the determining, forwarding over the network from the intermediary computer some of the SOAP messages to other intermediary computers and/or destination computers; and in accordance with the determining, not transmitting some of the SOAP messages.

33. A method according to claim 32, wherein the handling-limit values comprise maximum hop counts of the SOAP messages, the handled values comprise hop counts of the SOAP messages, and the determining comprises comparing the hop counts to the maximum hop counts.

34. A method according to claim 32, wherein the handling-limit values comprise respective maximum processing resources, the handled values comprise respective cumulative amounts of processing resource used by other intermediary computers to process the SOAP messages, and the SOAP messages that are not transmitted comprise SOAP messages for which the intermediary computers together used more computing resource than permitted by the respective processing resource maximums.

* * * * *